Aug. 5, 1969  G. F. McDONNELL  3,459,116
APPARATUS FOR CONTROLLING THE RIPENING OF BANANAS
Filed Feb. 1, 1965  3 Sheets-Sheet 1

INVENTOR
GERALD F. McDONNELL

BY
Mason, Fenwick & Lawrence
ATTORNEYS

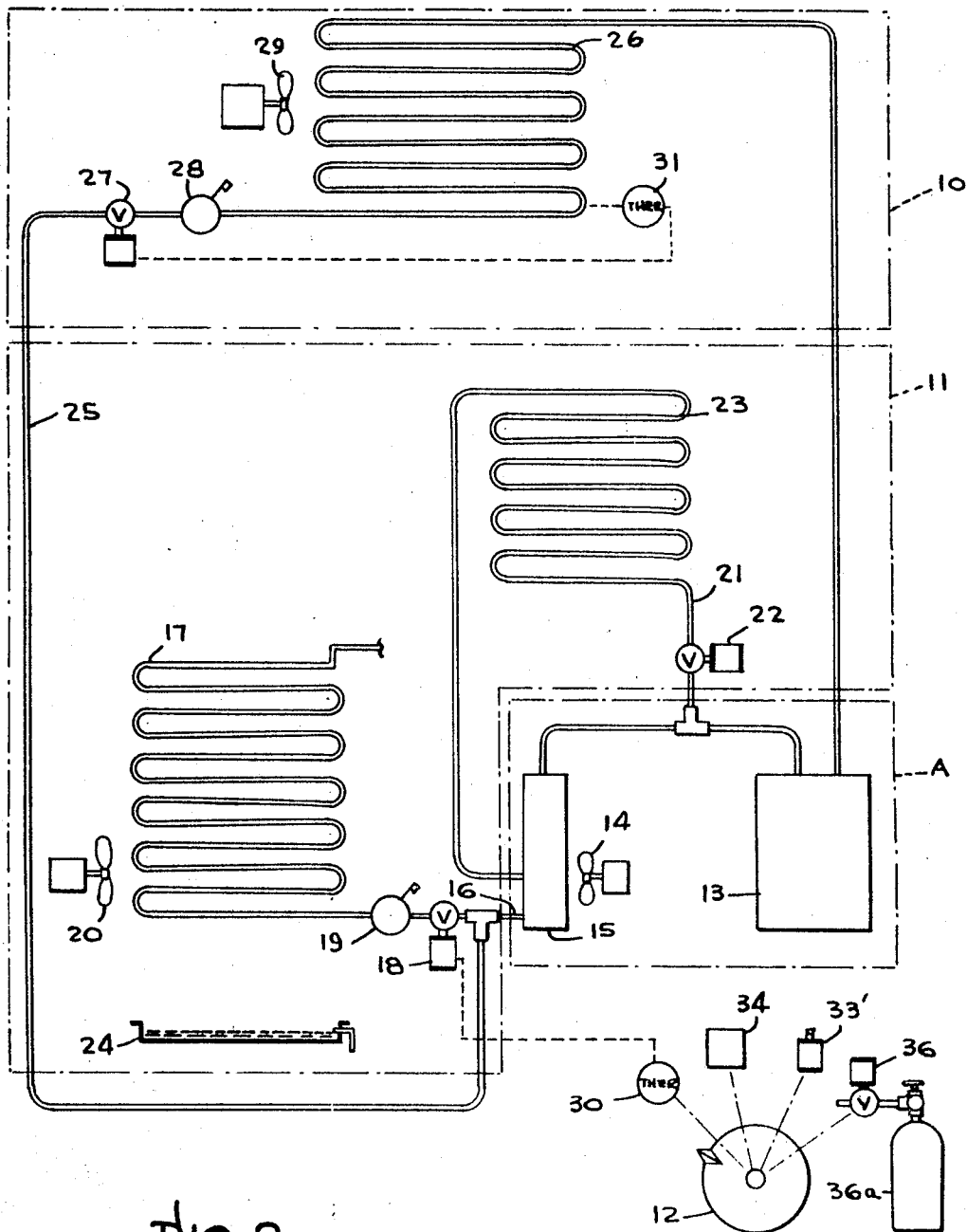

Aug. 5, 1969     G. F. McDONNELL     3,459,116
APPARATUS FOR CONTROLLING THE RIPENING OF BANANAS
Filed Feb. 1, 1965     3 Sheets-Sheet 3
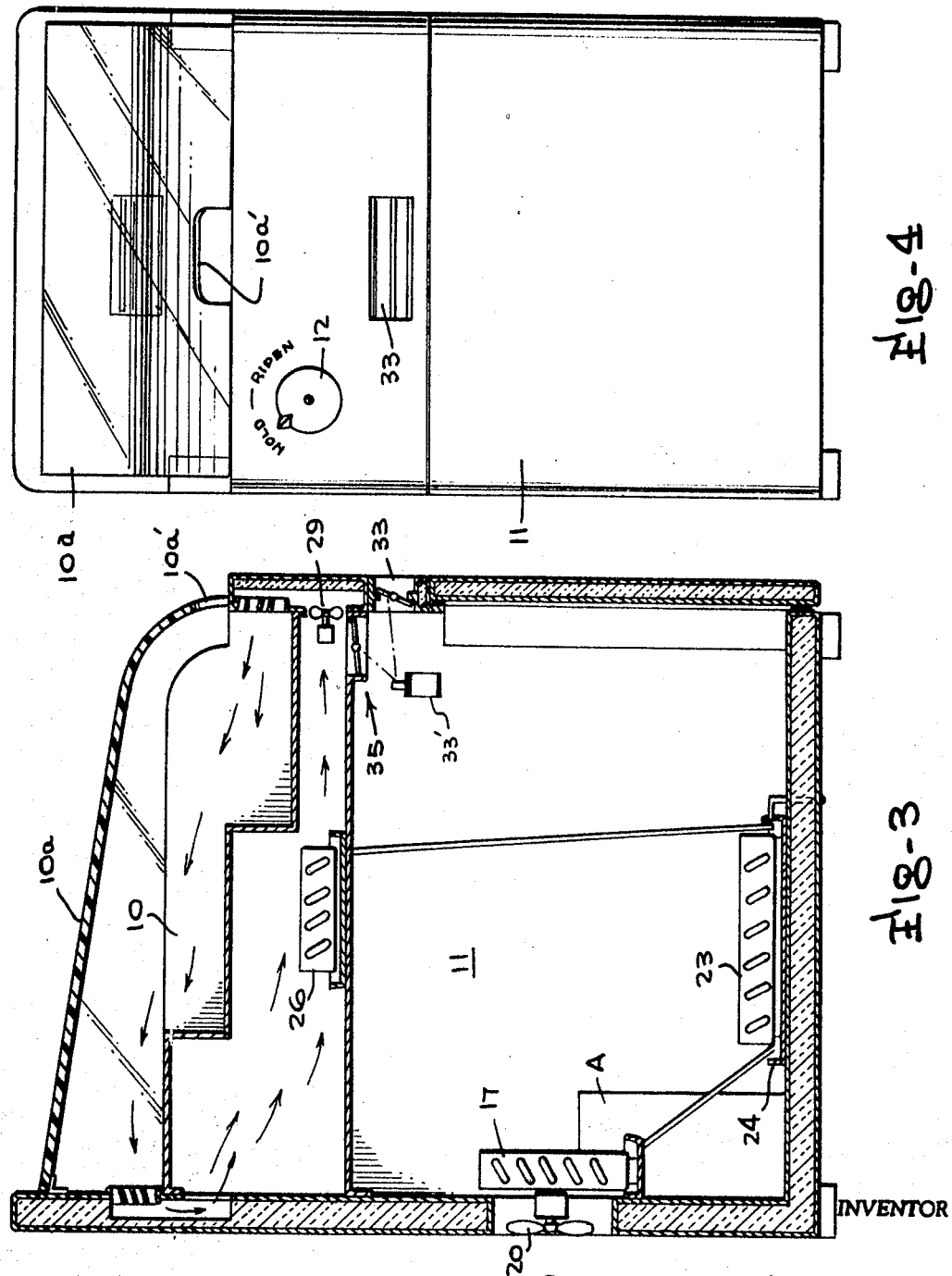
INVENTOR
GERALD F. McDONNELL
BY
Mason, Fenwick & Lawrence
ATTORNEYS United States Patent Office 3,459,116
Patented Aug. 5, 1969

3,459,116
APPARATUS FOR CONTROLLING THE
RIPENING OF BANANAS
Gerald F. McDonnell, 222 Deckbar, Apt. 141,
New Orleans, La. 70121
Filed Feb. 1, 1965, Ser. No. 429,233
Int. Cl. A23b 7/04; A23l 3/36; A47f 3/04
U.S. Cl. 99—239
11 Claims

ABSTRACT OF THE DISCLOSURE

Apparatus for selective and controlled ripening of bananas at supermarkets and the like comprising a compartmented storage container which resembles a supermarket refrigerant unit in which there are at least two compartments each separately regulated by suitable temperature control means, wherein the bananas can be separated into at least two groups, one of which may be displayed for sale and both of which groups may be controlled either to "RIPEN" the bananas or to "HOLD" the bananas from further ripening by controlling the temperature in the compartments typically at 57° Fahrenheit in the "HOLD" condition and about 71° Fahrenheit the "RIPEN" condition.

My invention eliminates the operation of ripening or maturing bananas or holding the bananas from spoilage by guesswork and human judgment, by the use of a 2 stage control, at the retail food store level, restaurant level, or consumer level in the publication entitled "Bananas" by Simmonds, N. W. Longmans, Green and Co., Ltd. 1959, there is an explanation of banana ripening including the definition of post-climacteric on page 221. Also, in another publication entitled "Bananas" by Von Loesecke, Harry W., Interscience Publishers, Inc., N.Y., revised ed., there is a color chart on pages 108 and 109, which identifies the color of a banana by reference numerals such as 4, 5, 6 etc. which will be referred to throughout this specification.

An important object of the invention is to provide one refrigerant motor and compressor, separate blowers for the TOP and BOTTOM compartments, separate cooling coils and thermostats, an electric heater or heating coil half-way submerged in a pan of water, and regulated by a humidistat.

A further object of the invention is to provide a thermostat for the TOP compartment which is set at 57° degrees Fahrenheit at all times and is not regulated by the BOTTOM compartment controls or thermostats.

A further object of the invention is to provide a thermostat for the BOTTOM compartment which is tied into, along with an electric operated solenoid for the vents, and a humidistat, a two (2) stage control designated HOLD-RIPEN.

A further object of the invention is to provide a TOP and BOTTOM compartment and a removable door to the TOP compartment and a door for the BOTTOM compartment for opening and closing.

A further object of the invention is to provide an inhibitor gas in the correct amounts to retard ripening and spoilage without affecting the taste and quality of the bananas.

Other objects and advantages of the invention will be apparent during the course of the following description:

Brief description of the figures

FIG. 2 is a diagrammatic flow diagram of the heating, cooling and humidity control arrangement in the device shown in FIG. 1.

FIG. 3 is a cross-sectional view longitudinally through the display unit shown in FIG. 1 with portions removed.

FIG. 4 is a diagrammatic end elevation view of the device shown in FIG. 1.

Figure 1:
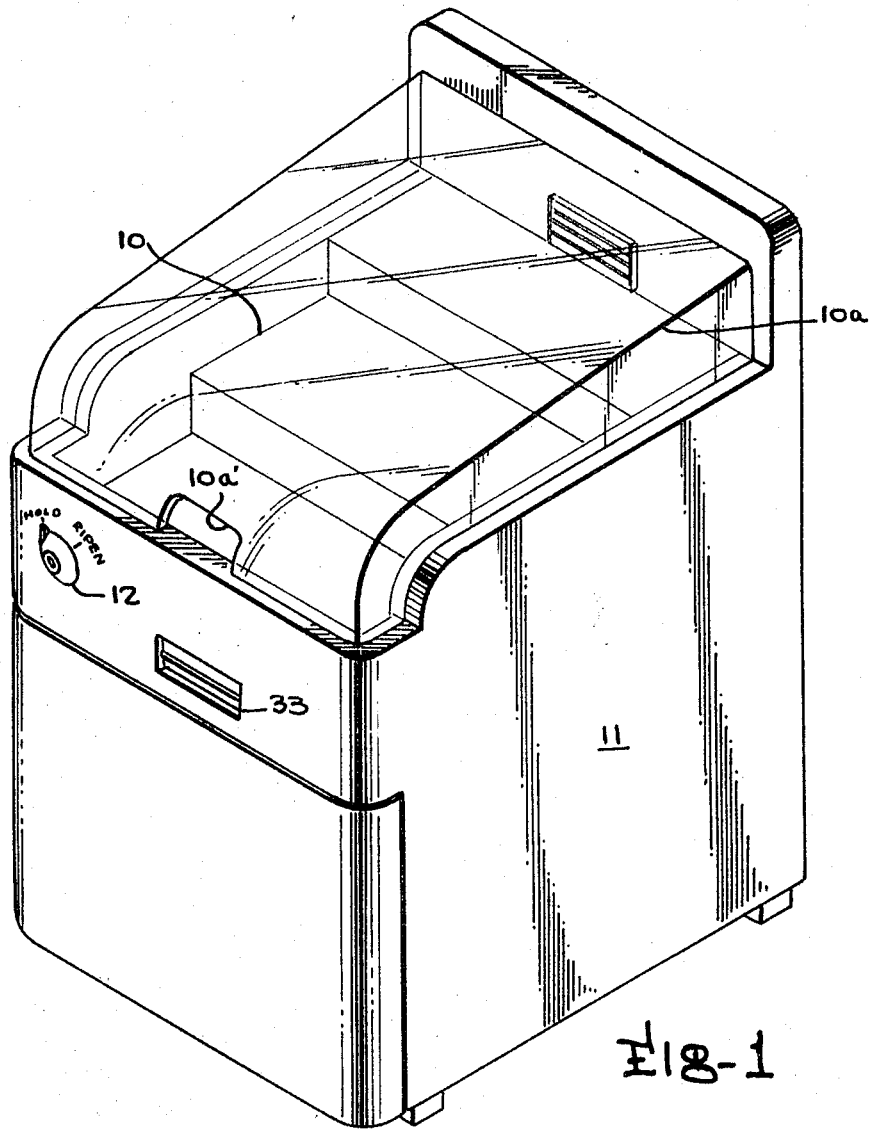
FIG. 1 is a perspective view of a display and storage unit made in accordance with the present invention.

In the drawing, wherein for the purpose of illustration, is shown an embodiment of my invention. Reference character 10 designates the TOP compartment in which bananas are displayed and maintained from spoilage in a controlled atmosphere for selling purposes or consumption in a Color 4, 5, 6, 7. A removable door 10a covers the display area and small ventilation spaces 10a' are at the end of the door.

Reference character 11 designates the BOTTOM compartment where the box bananas are stored on racks in a controlled atmosphere. The bananas can be ripened in the post-climacteric period or held against the damage-producing and spoilage-producing room atmosphere properly for maximum life or for quick, efficient, automatic ripening at the selection of a control 12.

In FIGURE 2 of the drawings are shown the refrigerant and heating controls and schematic operation of the working parts of the machine. Section A designates the refrigerant compressor 13, fan 14 and condenser 15 which is located in the bottom section of the apparatus. As illustrated in FIGURE 2, a liquid line 16 extends from the outlet of the condenser 15 to the cooling coil 17 located in the lower compartment, which cooling coil is oversized, and the liquid line 16 includes a solenoid valve 18 and expansion valve 19 therein. The outlet end of the cooling coil 17 is connected by a suction return to outside. A fan 20 in the lower compartment propels air over the cooling coil 17. A hot gas line 21 having a solenoid valve 22 therein extends from the compressor discharge line to a heating coil 23, also in the lower compartment, which is returned to the condenser 15. A water pan or humidifier 24 is also provided in the lower compartment. A branch liquid line 25 also extends from the outlet of the condenser 15 to the cooling coil 26 in the upper compartment which is returned to the compressor. The branch liquid line 25 also has a solenoid valve 27 and an expansion valve 28 therein, and a fan 29 is provided in the upper compartment for propelling air over the cooling coil 26. Thermostats 30 and 31 are respectively provided in the lower and upper compartments 11 and 10. FIGURE 2 does not show the locations inside the apparatus but only illustrates the parts that are used.

FIGURES 3 and 4 show the location of the various main parts and air flow and location of the vents.

The detailed description and operation of the apparatus is as follows:

When bananas are delivered to the apparatus from the warehouse level during the post-climacteric period of the bananas and the color of the bananas are 4, or 5, or 6, or 7 the control 12 regulating the atmosphere in the BOTTOM compartment 11 is put in the position of HOLD from spoilage.

The TOP compartment thermo-stat 31, which is separate from the control of the BOTTOM compartment 11 but is operated by the same compressor, is pre-set at 57° degrees Fahrenheit at all times. The solenoid valve 27 is open to the expansion valve 28 at all times to allow the gas to pass from the condenser and then through the liquid gas line 25. The TOP compartment coils 26 are over-sized in order to accumulate moisture and let the water run down a hose to a water pan 24 in the BOTTOM compartment. The cooling fan 29 in the TOP compartment has a velocity of five (5) to nine (9) air changes per cubic foot per minute.

When the 2 stage control 12 is in the HOLD position the thermo-state 30, which is tied-in to the 2 stage control, is turned to 57° degrees Fahrenheit and the gas runs from the condenser 15 to the liquid gas line 16. The solenoid valve 18 is electrically thermo-stat controlled and allows gas to run to the over-sized cooling coil 17 which is open to the expansion valve 19 and the blower unit 20 and provides new air streams in a velocity of five (5) to nine (9) cool air changes per cubic foot per minute.

When the 2 stage control 12 is in the position of HOLD the vents 35, leading to the BOTTOM compartment 11 are automatically opened, see FIGURE 3.

The humidity is regulated by a humidistat 34, which is tied-in to the 2 stage control 12. When the control 12 is in the position of HOLD the humidistat 34 is set on the 75% relative humidity mark so that the water in the pan 24 located in the bottom of the BOTTOM compartment— see FIGURE 3—gives off moisture in the 72% to 78% relative humidity range. The cooling coil 26 and cooling coil 17 are over-size to give off water and have hoses leading to the water pan 24 which also has an overflow to the outside of the apparatus. The air flow from fan 20 circulates the moisture and fan 29 sucks the air and moisture from the BOTTOM compartment through the vents 35 leading to the TOP compartment from the BOTTOM compartment to provide a 72% to 78% relative humidity range in the TOP compartment also.

When the 2 stage control 12 is set on the position of HOLD the open and close valve 36 is electrically tied-in to the 2 stage control 12 so that the valve 36 regulating the amount of ozone is opened and a concentration of ozone admitted to the compartment 11 from ozone tank 36a amounting to 30 to 47 p.p.m. which inhibits the ripening of the bananas oxidizing the ethylene gas produced by the bananas.

When bananas are delivered to the apparatus from the warehouse level during the post-climacteric period of the bananas and the color of the bananas are 2, or 3, or 3+, and more color is desired; the control 12 regulating the BOTTOM compartment is turned to the position of RIPEN.

Thermo-stat 30 which is tied-in to the 2 stage control shuts off fan 20 completely. The solenoid valve 18 closes leading into liquid gas line 16 and expansion valve 19. The solenoid valve 22, which is thermo-stat electrically controlled, on the hot gas line 21 opens and allows the gas to enter the heating coil 23 (an alternate method is to not have a heating coil and allow the hot gas line run into the oversized cooling coil 17 and let the cooling coil 17 heat the bottom compartment) which is half submerged in the water pan in order to raise the temperature in the BOTTOM compartment to 71 degrees Fahrenheit. Thermo-stat 30 is turned to 71 degrees when the 2 stage control is in the position of RIPEN. Thermo-state 30 will have double contacts—one for cooling at 57 degrees F. and one for heating at 71 degrees F. and vice versa.

The ventilation for the BOTTOM compartment will be on the side directly opposite the cooling coil 17 and fan 20. The vents are electrically operated by solenoid switch 33' tied-in to the 2 stage control. When the control is in the position of RIPEN all the vents leading into the BOTTOM COMPARTMENT automatically close so that air tightness is maintained.

The humidity in the BOTTOM compartment during the RIPEN cycle is regulated by the water pan or humidifier 24 in the bottom section of the BOTTOM compartment, which is controlled by the humidistat 34. During the ripening of the bananas the heating coil, which is half submerged in the water pan, creates a 85% to 100% relative humidity. The air tightness of the BOTTOM compartment during this ripening stage allows this humidity range to be easily maintained and rapidly brought to this high humidity range. This water pan has an over flow leading to the outside to allow the right amount of water to be available at all times. The humidistat is tied-in electrically to the 2 stage control so that when the control is in the position of RIPEN the humidistat is set on the 92% relative humidity index mark.

When the 2 stage control is set on the position of RIPEN the valve 36 regulating the amount of ozone into the BOTTOM compartment, which is tied-in on a circuit to the 2 stage control, is shut off completely so that the inhibitor gas against ripening is not present during the ripening cycle.

It is understood that the form of my invention herewith shown and described, is to be taken as a preferred example of the same and that various changes in the shape, size (not to exceed 300 cubic feet or be less than 40 cubic feet), location and arrangement of parts may be resorted to, without departing from the spirit of my invention, or the scope of the subjoined claims.

Having thus described my invention, I claim the following:

1. A unit for controlling the ripening of bananas: at least two separate compartments, a coil and blower unit for each compartment, one thermo-stat controlling one coil and blower unit in one of said compartments, another thermo-stat controlling the coil and blower unit in the other compartment preset at all times for 57° temperature, solenoid valve means for each thermo-stat controlling a cooling coil in each of said compartments and controlling a heating coil in said one compartment, a control for said one thermo-stat and said control being a two-stage control designated HOLD-RIPEN and being connected to said one thermo-stat whereby in the position of HOLD said one thermo-stat is set on 57° Farenheit and when the control is moved to the position of RIPEN said one thermo-stat is set at 71° Farenheit automatically, to provide the temperatures necessary to HOLD bananas from spoilage in the respective compartments simultaneously or RIPEN bananas in the one compartment while holding the bananas in the other compartment at the same time, during the post-climacteric period of the bananas.

2. The unit equipment as stated in claim 1, wherein there are oversize-coils with over-flows, a water pan in the lower section of the one compartment a humidistat circuited to the two stage control designated HOLD-RIPEN, and when the control is in the position of HOLD the relative humidity rises to a 72% to 77% range which is regulated by the humidistat on the setting of 75, whereby in both the compartments the precise amount of moisture is concentrated in the two compartments so that proper transfer of water to the banana pulp from the peel is completed at the proper rate and the air does not draw moisture from the peel in large amounts, shrinkage in the bananas is practically eliminated.

3. The device in claim 2, wherein; the relative humidity in said one compartment only, rises to the 85% to 100% range in which the humidistat is electrically circuited to the 92 mark when the 2 stage control is in the position of RIPEN whereby 85% to 100% humidity range gives the precise amount of moisture concentration to increase the transpiration and osmotic pressure (along with the 71° F. temperature) and prevent a high water loss when the pulp draws moisture from the peel and the peel draws water from the neck and the air and high humidity will accelerate the ripening properly and prevent a high loss of water content from the bananas.

4. The device claimed in claim 3, wherein said device may hold bananas in Colors 4, 5, 6 and 7, and prevent bananas from spoilage producing waste, prevents suppressed "heating or boiled" bananas, "chilled" bananas, up to 12 days depending on the color and condition prior to introduction into the device; and simultaneously if desired ripen and mature bananas from a Color 2, 3, or 3+, to any color needed in the rapid and precise manner without damage to the color, taste, or quality of the bananas by a turn of a single dial.

5. The device claimed in claim 3, wherein the air movement inside the compartments is at a high velocity in that an air change occurs five (5) to nine (9) times per cubic foot per minute in order to move a large percentage of ethylene gas, which is produced by the bananas, from the enclosed area so that the ethylene gases do not accelerate the ripening and hasten spoilage and waste.

6. The device claimed in claim 5, wherein the blower unit automatically shuts off in said one compartment only so that the autocatalyst ethylene gas, which is produced by the bananas, can be absorbed by the bananas for rapid acceleration of the ripening process in the bananas, in the most precise manner and proper conditions possible.

7. The device claimed in claim 6, including vents communicating with said one compartment for passage of gases therefrom, wherein when said unit is in the position of HOLD, vents leading into said one compartment are opened automatically by an electrically controlled solenoid switch circuited to the two state control, so that a regulated ventilation atmosphere is maintained and a high percentage of ethylene gas given off by the bananas are driven through the vents so as to not accelerate ripening but still traps the flavor producing volatile ester gases given off by the bananas in large amounts for a higher flavor and aroma.

8. The device claimed in claim 7, wherein: when the control is in the position of RIPEN, all the vents leading into said one compartment are closed automatically by an electrically controlled solenoid switch circuited to the 2 stage control, so that an air tight atmosphere and controlled atmosphere is maintained so none of the gasses given off by the bananas can escape and a high temperature and humidity is easily maintained and precise atmospheric conditions prevail for ripening the bananas.

9. The device claimed in claim 8, wherein when the control is moved from the position of RIPEN and the control is in the position of HOLD, that new cool air streams with direct velocity from both blower units come in direct contact with the bananas so that the same air inside the devise is not recirculated and that the ethylene gas given off by the bananas are not recirculated and allowed to accumulate, and new cool air streams in the one compartment are blown through the vents and sucked in and air is blown into said one compartment and the suction return of cooling coil sucks in new air for the proper circulation in holding bananas from spoilage and when the 2 stage control is in the RIPEN position the vents are closed and new air streams do not enter the one compartment and all the ethylene gasses and ester gasses are trapped for the most proper and precise conditions for ripening bananas prevail.

10. The device claimed in claim 9, wherein when the control is in the position of HOLD, ozone is admitted in concentrations of 30 to 47 p.p.m. to oxidize the ethylene gas given off by the bananas without harmful affects to the taste, quality, and color of the bananas, ozone in the concentration of 30 to 47 p.p.m. serving to retard ripening and prevent fungal spoilage and degenerative breakdowns of the peal to occur when the 2 stage control is in the position of RIPEN, the circuit regulating the opening and closing of the valve will electrically close the valve so that precise ripening conditions will prevail.

11. The device claimed in claim 10, wherein the device contains not more than 300 cubic feet enclosed area and not less than 40 cubic feet making the device mobile for use in any area desired and the small enclosed area in ratio to the amount of bananas enclosed precisely traps a high percentage of natural flavor and aroma producing gasses given off by the bananas during the post-climacteric period of the bananas for a higher quality taste and flavor unmatched by any other method or process.

References Cited

UNITED STATES PATENTS

| | | | |
|---|---|---|---|
| 246,664 | 9/1881 | Crowell | 99—271 X |
| 1,817,875 | 8/1931 | Broadbent | 99—271 X |
| 2,251,617 | 8/1941 | Pirnie | 99—271 X |
| 2,711,471 | 6/1955 | Sussman | 99—240 X |

ROBERT W. JENKINS, Primary Examiner

U.S. Cl. X.R.

62—253, 255; 99—154, 193